Dec. 5, 1967 E. HEBER 3,356,861

PASSIVE PULSE WIDTH DISCRIMINATOR UTILIZING STORAGE EFFECT OF DIODES

Filed June 24, 1964 2 Sheets-Sheet 1

INVENTOR
E. HEBER
BY
[signature]
ATTORNEY 3,356,861
PASSIVE PULSE WIDTH DISCRIMINATOR UTILIZING STORAGE EFFECT OF DIODES
Emery Heber, West Orange, N.J., assignor to Bell Telephone Laboratories, Incorporated, New York, N.Y., a corporation of New York
Filed June 24, 1964, Ser. No. 377,769
5 Claims. (Cl. 307—88.5)

ABSTRACT OF THE DISCLOSURE

A pair of paths are connected between an input terminal and an adder circuit. One of these paths comprises a differentiating circuit and a diode that stores a predetermined minority carrier charge. The other path comprises a differentiating circuit and a clamping diode. Depending upon the polarity connections of these paths, discrimination against pulses longer or shorter than a predetermined duration is achieved.

BACKGROUND OF THE INVENTION

1. *Field of the invention*

This invention relates to electronic circuits which have discriminatory characteristics, and in particular to such circuits that produce outputs only upon the occurrence of electrical pulse inputs of particular durations.

2. *Description of the prior art*

In many electronic fields, input signals other than those desired often occur. Since the undesired signals may result in the production of false outputs, circuits have been devised to discriminate against the undesired signals. One class of such circuits discriminates against input signals on a pulse width basis and, consequently, these circuits are referred to as pulse width discriminators.

Because of the function that pulse width discriminators perform in electronic systems, it is necessary that they operate in a highly reliable manner. One well-recognized technique for increasing reliability in a circuit is to keep the number of circuit elements to a minimum. Further reliability can be achieved when active circuit elements are not used because the circuit may then be operated independently of a power supply whose failure would otherwise render the circuit inoperative.

SUMMARY OF THE INVENTION

An object of the present invention is to increase the reliability of pulse width discrimination by performing this function through the use of a minimum number of passive elements.

This and other objects are achieved in accordance with the invention by differentiating input pulses to produce pulses corresponding to the leading and trailing edges of the input pulses. The leading edge pulses are used to place a predetermined minority carrier charge in a diode, which charge then dissipates as a function of time. When some of the charge is present upon the occurrence of a trailing edge pulse, it, with the remaining charge, produces a pulse. This pulse is subtracted from the trailing edge pulse when input pulses having durations less than a predetermined value are to be discriminated against. The maximum amplitudes of the resulting pulses therefore occur when the durations of the input pulses are sufficiently long so that the minority carrier charges stored in the diode have been dissipated. When these resulting pulses have amplitudes less than their maximum values, they fail to exceed the sensitivity level of the utilization circuit to which they are applied, thus discriminating against input pulses having durations less than a predetermined value.

When pulses having durations greater than a predetermined value are to be discriminated against, the pulse produced by way of the remaining charge is added to the trailing edge pulse. The minimum amplitudes of the resulting pulses occur when the durations of the input pulses are sufficiently long so that the minority carrier charges stored in the diode have been dissipated. When these resulting pulses have amplitudes equal to or slightly greater than their minimum values, they fail to exceed the sensitivity level of the utilization circuit to which they are applied, thus discriminating against pulses having durations greater than a predetermined value.

In one of its principal forms, the invention comprises a pair of paths and an adder circuit with each of the paths connected between a common input and the adder circuit. The first of these paths includes a differentiating circuit for differentiating input pulses. The portion of the differentiated signal corresponding in time to the leading edge of the input pulse places a predetermined minority carrier charge in a diode included in the path. Following the termination of this portion of the differentiated signal, the charge in the diode dissipates as a function of time. When a portion of the charge is present in the diode upon the occurrence of the portion of the differentiated signal corresponding to the trailing edge of the input pulse, the charge is rapidly dissipated to produce a pulse whose amplitude is related to the charge. This last-mentioned pulse is applied to the adder.

The second path includes a differentiating circuit and a clamping diode. The output from this path, as mentioned previously, is applied to the adder.

As explained in detail in the following discussion with respect to the disclosed embodiments, discrimination against either short or long input pulses is determined by the polarity relationship between the outputs of the two paths as they are applied to the adder circuit. With one polarity relationship discrimination against short pulses is achieved, while with the opposite polarity relationship discrimination against long pulses is achieved.

A feature of the invention is the above discussed second path which, in effect, changes the reference level of the adder circuit output when the first path output is anticipated so that the first path output appears on a pedestal in the adder circuit output. This feature enables the sensitivity level of the following utilization circuit to be set at a level whereby that circuit is substantially immune to noise signals occurring between the trailing edges of the input pulses.

Other objects and features of the invention will become apparent from a study of the following detailed description of several embodiments.

DESCRIPTION OF THE DISCLOSED EMBODIMENT

Figure 1:
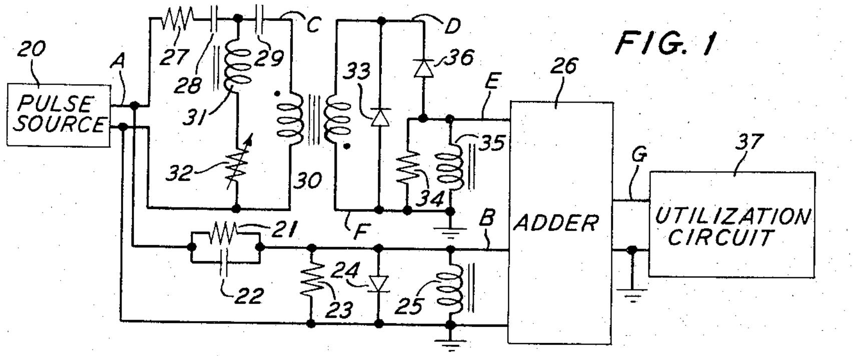
FIGS. 1 and 2 are schematic diagrams of two embodiments, respectively, of the invention.

The embodiment of FIG. 1 is connected to the output of a pulse source 20. The embodiment is considered in the following discussion as comprising an upper path and a lower path, each of which is supplied by the output of source 20 by a lead A and a ground lead.

The lower path includes a parallel combination of a resistor 21 and a capacitor 22 with one extremity of the parallel combination connected to lead A. A second parallel combination of a resistor 23, a diode 24 and an inductor 25 is connected between the ground lead and the remaining extremity of the parallel combination of resistor 21 and capacitor 22. Diode 24 is poled for easy current flow toward the ground lead. Resistor 21 and capacitor 22 perform an isolating function between the lower path and source 20 while resistor 23 and inductor 25 form a differentiating circuit. Diode 24 performs a limiting action on a portion of the differentiated signal produced by resistor 23 and inductor 25. The signal developed across this second parallel combination is applied by a lead B and the ground lead to an adder 26. Adder 26 is conventional and may, for example, comprise a resistor network.

The upper path includes a resistor 27, a pair of capacitors 28 and 29 and a primary winding of a transformer 30 connected in series in that order between lead A and the ground lead. The connection between capacitor 29 and the primary winding of transformer 30 is identified as lead C. An inductor 31 and a variable resistor 32 are connected in series between the junction between capacitors 28 and 29 and the ground lead. Resistor 27 performs an isolating function between the upper path and source 20 while capacitors 28 and 29 and inductor 31 comprise a high pass filter for differentiating input pulses. Variable resistor 32 is provided for controlling the Q of inductor 31 which, in turn, determines the pulses to which the embodiment responds to produce output signals.

A pair of leads D and F are connected to the extremities, respectively, of the secondary winding of transformer 30. Lead F is connected to a point of ground potential. The windings of transformer 30 are poled so that when the signal on lead C with respect to the ground lead is positive-going, the signal on lead D with respect to lead F is negative-going.

A diode 33 is connected between leads D and F with the diode poled for easy current flow from lead F to lead D. A parallel combination comprising a resistor 34 and inductor 35 is connected in series with a diode 36. This series combination is connected between leads D and F with diode 36 connected to lead D and poled for easy current flow from lead F to lead D. The signal developed across the parallel combination of resistor 34 and inductor 35 is applied as an input by a lead E and ground to adder 26.

The output of adder 26 is applied by a lead G and a ground lead to a utilization circuit 37.

Figure 2:
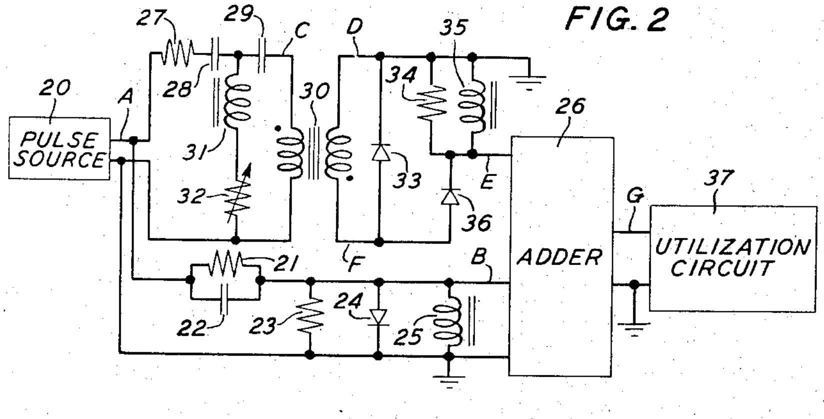

As will become apparent from the following discussion, the above described embodiment discriminates against signal pulses having durations less than a predetermined duration. When it is desired to discriminate against pulses having durations exceeding a predetermined duration, the signal developed across resistor 34 is applied to adder 26 in the opposite polarity sense. It has been found that this is advantageously accomplished by reversing the serial positions of diode 36 and the parallel circuit comprising resistor 34 and inductor 35 and, at the same time, grounding lead D instead of lead F. This is shown in the schematic diagram of FIG. 2. It should be noted that in each arrangement, a terminal of the transformer secondary winding is returned to a point of ground potential, which in many applications is a desirable, if not necessary, way to use a pulse type transformer. FIG. 2 is discussed in greater detail subsequently.

The operation of the embodiment of FIG. 1 is now considered in detail with the help of the waveforms shown in FIGS. 3 through 8. The waveforms of FIGS. 3 through 10 are shown in time alignment so that the time scale shown in FIG. 10 is applicable to the other waveforms.

Figures 3, 4, 5, 6, 7, 8, 9, 10:
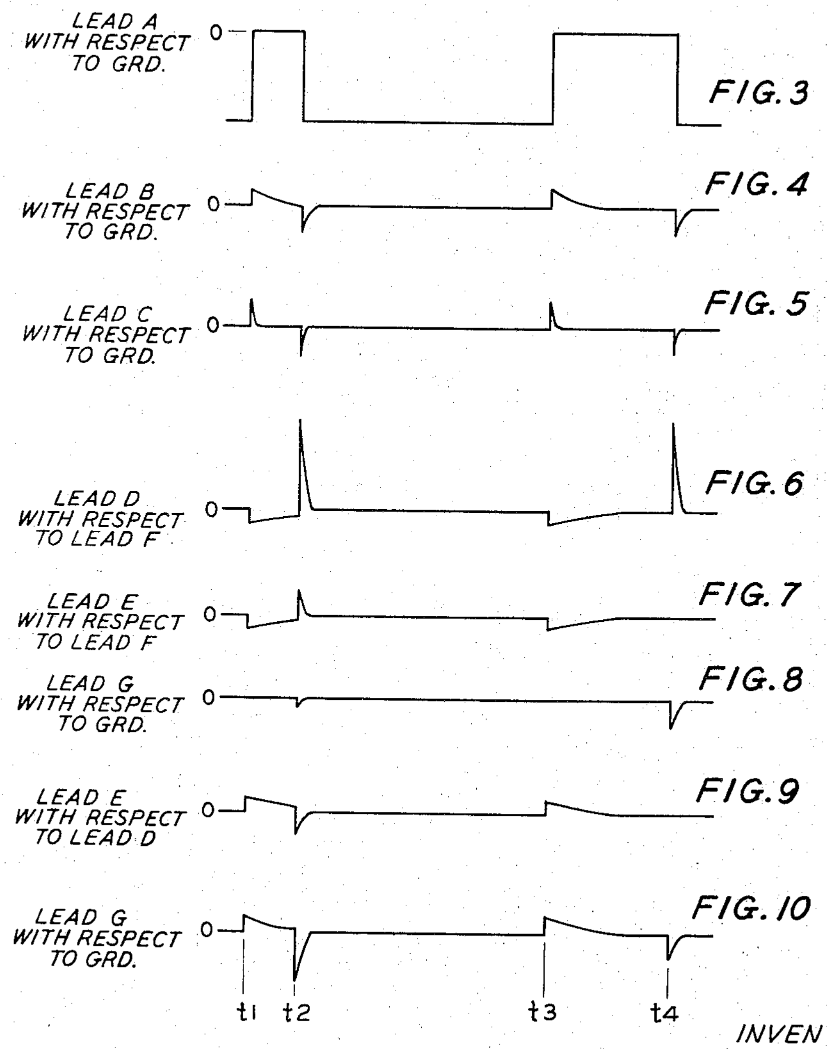
FIGS. 3 through 10 are sketches of waveforms of voltages appearing between various leads of the embodiments of FIGS. 1 and 2.

As shown in FIG. 3 the potential on lead A with respect to ground is at a negative level in the absence of a pulse output from source 20. The occurrence of a pulse causes the potential on lead A to assume a zero level for the duration of the pulse. Other types of voltage level changes may be used as input pulses by making appropriate reference voltage changes in the embodiment as appreciated by those skilled in the art.

A pulse is shown in FIG. 3 as appearing on lead A (with respect to ground) between the times $t1$ and $t2$. The signal appearing on lead B with respect to ground in the lower path as a result of this input pulse is shown in FIG. 4. This signal is a modified differentiated form of the input pulse. In particular, when the potential on lead A goes to zero at time $t1$, the energy stored in inductor 25 causes the potential on lead B to become positive with respect to ground. The level of this potential is, however, limited by diode 24 to the forward drop across the diode. Diode 24 only conducts momentarily at time $t1$ because the stored energy in inductor 25 is rapidly discharged to the level where the remaining energy is insufficient to maintain the diode in a conducting state. This potential then decays in an exponential manner as shown in FIG. 4. When the potential on lead A returns to its negative value at the end of the pulse at time $t2$, diode 24 is back biased and consequently does not perform any limiting function. A relatively large exponentially-decaying pulse is produced on lead B at this time. The difference in the time constants for the discharging and charging of inductor 25 is produced by the difference in the resistance values of the discharging and charging paths for the inductor.

The input pulse between times $t1$ and $t2$ is symmetrically differentiated in the upper path by the differentiating circuit comprising capacitors 28 and 29, inductor 31 and resistor 32. The differentiated signal appearing between lead C and ground is shown in FIG. 5 at times $t1$ and $t2$ as positive and negative exponentially-decaying pulses, respectively. The positive pulse appearing at time $t1$ produces between leads D and F a negative potential which is limited by diode 33. This negative potential causes charges to be accumulated in diodes 33 and 36 which charges are dissipated in an exponential manner following time $t1$. The waveform of the potential appearing between leads D and F as a result of this limiting, storage and decaying action is shown in FIG. 6 between time $t1$ and just prior to time $t2$. At time $t2$ the negative pulse beween lead C and ground causes a positive exponentially-decaying pulse to appear on lead D with respect to lead F. This latter pulse is much greater in amplitude than the amplitude of the potential beween these leads at time $t1$ because neither of the diodes 33 and 36 limits the amplitude.

The waveform of the potential on lead E with respect to lead F (that is, with respect to ground), is shown in FIG. 7. Between time $t1$ and just prior to time $t2$ the waveform is substantially identical to that shown between these times in FIG. 6. The amplitude of the positive exponentially-decaying pulse appearing at time $t2$ of FIG. 7 is produced by way of the charge stored in diode 36 when the positive pulse at time $t2$ in FIG. 6 occurs. In particular, because of the poling of diode 36, a positive pulse on lead D with respect to lead F would, in the absence of any charge on diode 36, fail to produce any current in resistor 34. When, however, a charge of the proper polarity exists on diode 36 at the time a positive pulse appears on lead D with respect to lead F, this charge is rapidly dissipated to produce a positive pulse on lead E with respect to lead F. The amplitude of the positive pulse on lead E with respect to lead F is a function of the charge being dissipated. Since the charge present in the diode at that time is a function of time from the initial placement of charge on the diode, the amplitude of the pulse produced by way of the charge is, therefore, a function of the duration of the input pulse from source 20 of FIG. 3.

The last statement may be better appreciated by considering the operation of the embodiment to the pulse appearing between $t3$ and $t4$ in FIG. 3. The waveforms appearing in FIGS. 4, 5, and 6 in response to this input pulse are produced in the same manner as those produced in response to the input pulse between times $t1$ and $t2$. It should be noted, however, that the negative portion of the waveform in FIG. 6 has returned to the zero level before time $t4$. This is indicative that the charges placed on diodes 33 and 36 at time $t3$ have been dissipated by time $t4$. When, therefore, the positive pulse appears in FIG. 6 at time $t4$, a charge does not exist on diode 36 and, consequently, a positive pulse does not appear on lead E with respect to lead F as shown in FIG. 7 at this time. The amplitude of a positive pulse on lead E with respect to lead F in response to the action produced by the trailing edge of an input pulse from source 20 is, therefore, dependent on the duration of that input pulse.

The signals on lead E with respect to grounded lead F are added to the signals on lead B with respect to ground by adder 26. The results of this algebraic addition as they appear on lead G with respect to ground are shown by the waveforms in FIG. 8.

It should be noted in FIG. 8 that all of the voltages illustrated by the waveforms in FIGS. 4 and 7 substantially cancel one another with the exception of a relatively small negative pulse at time $t2$ and a relatively large negative pulse at time $t4$. The sensitivity level of utilization circuit 37 is such that the circuit does no respond to these pulses until they exceed a level just below that of the pulse at time $t4$. The embodiment when used in this manner therefore produces pulses of sufficient amplitude to trigger the utilization circuit only when the input pulses exceed a predetermined duration, thus providing pulse width discrimination.

In summary, the lower path produces a substantially constant amplitude output pulse when an output pulse from the upper path is anticipated. When a charge is present on diode 36 in the upper path upon the occurrence of a trailing edge of an input pulse, this path produces an output pulse of a polarity opposite to that of the second path and having an amplitude related to the charge. By adding the first path output pulse to the second path output pulse, the first path output pulse is in effect placed on a pedestal. The utilization circuit then responds only to pulses having amplitudes slightly less than or equal to the pedestal level. This pedestal feature enables the sensitivity level of the utilization circuit to be set at a level whereby the circuit is substantially insensitive to noise.

The embodiment of FIG. 1 discriminates against signal pulses having durations less than a predetermined duration. As mentioned previously, discrimination against pulses having durations in excess of a predetermined duration is accomplished by applying the signal developed across resistor 34 to adder 26 is the opposite polarity sense. The embodiment of FIG. 2 accomplishes this in a manner whereby a terminal of the transformer secondary winding is connected to a point of ground potential which in many circuits is a desirable, if not necessary, way to use a pulse type transformer. (The opposite terminal of this winding is grounded in FIG. 1.) In particular, the serial positions of diode 36 and the parallel combination of resistor 34 and inductor 35 in FIG. 1 have been interchanged in FIG. 2. Furthermore, the ground connection on lead F of FIG. 1 has been moved to lead D in FIG. 2.

The operation of the embodiment of FIG. 2 is now considered in detail.

As the lower path and the upper path up to and including the primary winding of transformer 30 of FIG. 2 are identical to the corresponding portions of FIG. 1, the waveforms of the voltages on lead B and C to ground are identical in both circuits for the same input. The voltage waveforms shown in FIGS. 4 and 5 are therefore produced on leads B and C to ground, respectively, of FIG. 2 in the same manner for the input shown in FIG. 3 as discussed with respect to FIG. 1.

The waveform of the voltage on lead F with respect to grounded lead D is not shown because it is merely the inversion of the waveform shown in FIG. 6. The manner in which this voltage is produced is identical to that discussed with respect to FIG. 1, the only difference being that polarity inversion is produced by grounding lead D instead of lead F.

FIG. 9 shows the waveform of the signals developed across resistor 34, that is lead E with respect to grounded lead D. This waveform is the inversion of the one shown in FIG. 7 and is produced in a manner substantially identical to that discussed with respect to FIG. 7.

The signals on lead E with respect to grounded lead D are added to the signals on lead B with respect to ground by adder 26. The results of this addition as they appear on lead G with respect to ground are shown by the waveforms of FIG. 10. It should be noted that the amplitude of the negative pulse at time $t2$ is greater than the amplitude of the pulse appearing at time $t4$. The sensitivity level of utilization circuit 37 is set so that the circuit responds only to negative pulses exceeding the amplitude of the pulse at time $t4$. Since the amplitude of the pulse at time $t4$ is the amplitude of all pulses produced when the input pulse width exceeds the desired duration, the embodiment produces pulses of sufficient amplitude to trigger the utilization circuit only when the input pulses are less than a predetermined duration, thus providing pulse width discrimination.

In summary, in FIG. 2 the charge on diode 36, when the trailing edge of the input pulse occurs, determines the level of the negative pulse, if any, appearing on lead E. The negative pulse produced by the lower channel occurring at the trailing edge of the input pulse, in effect, places any negative pulse from the upper channel at this time on a pedestal. The utilization circuit then responds only to pulses having levels in excess of the pedestal level. This pedestal feature of the invention enables the sensitivity level of utilization circuit 37 to be set at a level whereby the circuit is substantially insensitive to noise.

Figure 11:
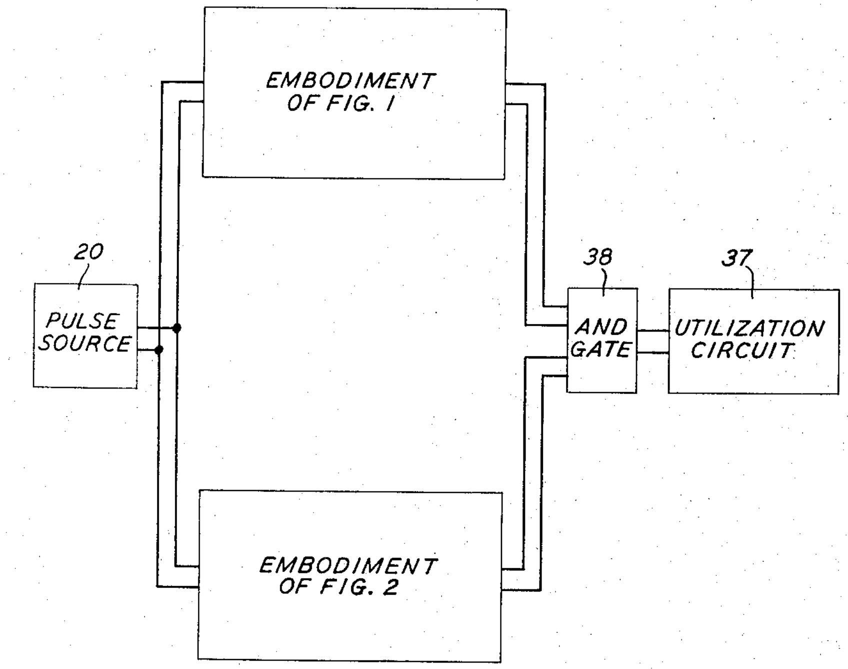
FIG. 11 discloses in block diagram form an arrangement using the embodiments disclosed in FIGS. 1 and 2.

Embodiments of the invention may also be used to produce outputs only in response to input pulses having durations between maximum and minimum limits. One arrangement for accomplishing this purpose includes one each of the embodiments of FIGS. 1 and 2. The inputs to the embodiments are connected to the pulse source while their outputs (leads G to ground) are connected to an AND gate. Such an arrangement is shown in block diagram form in FIG. 11 where the AND gate has been identified by the symbol 38. The simultaneous presence of two AND gate input signals in excess of predetermined levels causes the AND gate to produce an output signal, thus indicating that a pulse having a duration between the prescribed limits has occurred.

Although only several embodiments of the invention have been described in detail, various other embodiments may be devised without departing from the spirit and scope of the invention.

What is claimed is:

1. A discriminator comprising first differentiating means for differentiating input pulses, means connected to said first differentiating means for accumulating a predetermined charge in response to each of the output signals of said first differentiating means corresponding in time to the leading edges of said input pulses, said accumulating means dissipating at least a portion of said charge as a function of time beginning at the termination of said first differentiating means output signal producing said charge and the remainder of said charge in response to the next said first differentiating means output signal corresponding in time to the trailing edge of an input pulse to produce an output pulse whose amplitude is directly related to said remaining charge, second differentiating means for differentiating said input pulses, and summing means connected to said accumulating means and said second differentiating means to produce an output whose amplitude is a function of said accumulating means and second differentiating means outputs.

2. In combination a first differentiating circuit for differentiating input pulses, a first diode connected to said first differentiating circuit to limit the amplitude of its output signals produced in response to the leading edges of said input pulses, a second differentiating circuit for differentiating said input pulses, a second diode connected to said second differentiating circuit for limiting the amplitude of its output signals produced in response to the leading edges of said input pulses a third diode, a resistor, means connecting said third diode and said resistor in series, means connecting the series combination of said third diode and said resistor in parallel with said second diode with said third diode poled in the same sense with respect to said second differentiating circuit at said second diode, an adding circuit having two inputs and one output, and means connecting said adding circuit inputs across said first diode and said resistor, respectively.

3. In combination a diode, a resistive path connected in parallel with said diode, first means connected to said diode and responsive to an input pulse to place a predetermined minority carrier charge in said diode in response to the leading edge of said input pulse and to discharge through said resistive path in response to the trailing edge of said input pulse any of said minority carrier charge remaining in said diode, second means responsive to the trailing edge of said input pulse to produce a pulse of a predetermined amplitude, adding means having two inputs and one output, and means connecting said adding means inputs to said second means and said resistive path, respectively.

4. In combination first means having a relatively small direct current output resistance and producing a pulse of a first amplitude and polarity in response to the leading edge of an input pulse and a pulse of a second amplitude and the opposite polarity in response to the trailing edge of said input pulse, a diode, a resistor, third means connecting said diode and said resistor in series across said first means output with said diode poled to be forward biased by said pulse of said first amplitude and polarity, fourth means responsive to said input pulse to produce pulses in response to the leading and trailing edges thereof, respectively, and adding means having one input connected across said resistor and another input connected to said fourth means.

5. In combination a first differentiating circuit for differentiating input pulses, a first diode connected to said first differentiating circuit to limit the amplitude of its output signals produced in response to the leading edges of said input pulses, a second differentiating circuit for differentiating said input pulses, a transformer having its primary winding connected to the output of said second differentiating circuit, a second diode connected across the secondary winding of said transformer for limiting the amplitude of its output signals produced in response to the leading edges of said input pulses, a third diode, a resistor, means connecting said third diode and said resistor in series, means connecting the series combination of said third diode and said resistor across said transformer secondary winding with said third diode poled in the same sense with respect to said transformer secondary winding as said second diode, an adding circuit having two inputs and one output, and means connecting said adding circuit inputs across said first diode and said resistor, respectively.

No references cited.

ARTHUR GAUSS, *Primary Examiner.*

R. H. PLOTKIN, *Assistant Examiner.*